(12) United States Patent
Sano

(10) Patent No.: US 10,463,030 B2
(45) Date of Patent: Nov. 5, 2019

(54) FISHING HOOK WITH GUARD

(71) Applicant: GAMAKATSU CO., LTD., Nishiwaki-shi, Hyogo (JP)

(72) Inventor: Kazunori Sano, Nishiwaki (JP)

(73) Assignee: GAMAKATSU CO., LTD., Hyogo (JP)

( * ) Notice: Subject to any disclaimer, the term of this patent is extended or adjusted under 35 U.S.C. 154(b) by 188 days.

(21) Appl. No.: 15/738,445

(22) PCT Filed: Jun. 22, 2015

(86) PCT No.: PCT/JP2015/003112
§ 371 (c)(1),
(2) Date: Dec. 20, 2017

(87) PCT Pub. No.: WO2016/207925
PCT Pub. Date: Dec. 29, 2016

(65) Prior Publication Data
US 2018/0168136 A1   Jun. 21, 2018

(51) Int. Cl.
*A01K 85/02*  (2006.01)
*A01K 83/00*  (2006.01)
*A01K 91/06*  (2006.01)

(52) U.S. Cl.
CPC ............. *A01K 85/02* (2013.01); *A01K 83/00* (2013.01); *A01K 91/06* (2013.01)

(58) Field of Classification Search
CPC ................................. A01K 85/02; A01K 83/00
USPC ......................................................... 43/42.1
See application file for complete search history.

(56) References Cited

U.S. PATENT DOCUMENTS

| 1,773,561 A | * | 8/1930 | Wethall | A01K 85/02 |
| | | | | 43/42.04 |
| 2,989,816 A | * | 6/1961 | Ebert | A01K 85/02 |
| | | | | 43/42.4 |
| 3,750,321 A | * | 8/1973 | McClellan | A01K 85/00 |
| | | | | 43/42.1 |

(Continued)

FOREIGN PATENT DOCUMENTS

| JP | 49-16950 Y1 | 4/1974 |
| JP | 2003070381 A | 3/2003 |

(Continued)

OTHER PUBLICATIONS

International Search Report dated Aug. 25, 2015 for Application No. PCT/JP2015/003112 and English translation.

*Primary Examiner* — Christopher P Ellis
(74) *Attorney, Agent, or Firm* — Lucas & Mercanti, LLP

(57) ABSTRACT

A guard-equipped fishing hook 50 includes: a fishing hook 30; a guard 10 formed by bending a wire-like material in a V shape; and a base 20 fixed to a shank 30b of the fishing hook 30 and having a guard attachment hole 24 formed therein, the guard attachment hole 24 holding the guard 10 such that the guard is positioned in front of a hook tip 30a when an insertion end 10a as a bent end of the guard 10 is inserted into the guard attachment hole 24. The guard 10 is made of a superelastic alloy. The guard attachment hole 24 is formed so as to be gradually tapered from an opening 24a thereof to a deepest end thereof. A bending angle $\theta$ of the insertion end 10a of the guard 10 is larger than an opening angle $\alpha$ of the guard attachment hole 24.

2 Claims, 3 Drawing Sheets

(56) References Cited

U.S. PATENT DOCUMENTS

| | | | | |
|---|---|---|---|---|
| 5,175,955 A * | 1/1993 | Wilson | ............... | A01K 85/00 43/42.36 |
| 5,381,623 A * | 1/1995 | Crisp | ............... | A01K 85/02 43/42.43 |
| 5,551,185 A * | 9/1996 | Reed | ............... | A01K 85/00 43/42.31 |
| 7,421,820 B2 * | 9/2008 | Harrell | ............... | A01K 91/04 43/42.39 |
| 7,694,453 B1 * | 4/2010 | Arrico | ............... | A01K 85/02 43/42.06 |
| 2005/0183323 A1 * | 8/2005 | Harrell | ............... | A01K 85/00 43/42.39 |
| 2008/0148623 A1 * | 6/2008 | Uhrig | ............... | A01K 85/00 43/42.39 |
| 2008/0236022 A1 * | 10/2008 | Harrell | ............... | A01K 85/00 43/42.39 |
| 2013/0205642 A1 * | 8/2013 | Parks | ............... | A01K 85/02 43/42.4 |
| 2015/0047248 A1 * | 2/2015 | Riddle | ............... | A01K 85/02 43/43.1 |

FOREIGN PATENT DOCUMENTS

| | | |
|---|---|---|
| JP | 4778451 B2 | 7/2011 |
| WO | 2013069062 A1 | 5/2013 |

* cited by examiner

[FIG. 1]
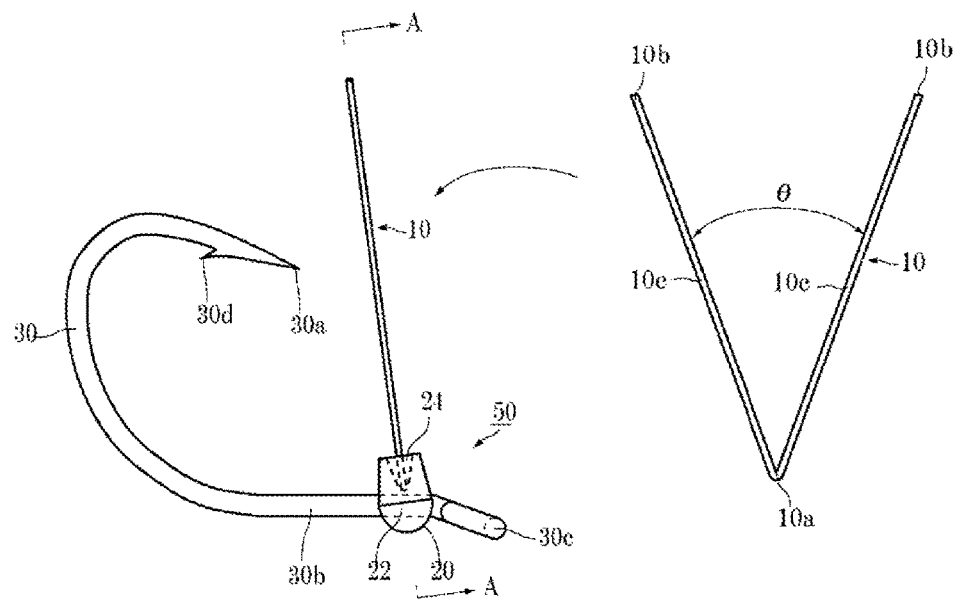
[FIG. 2]
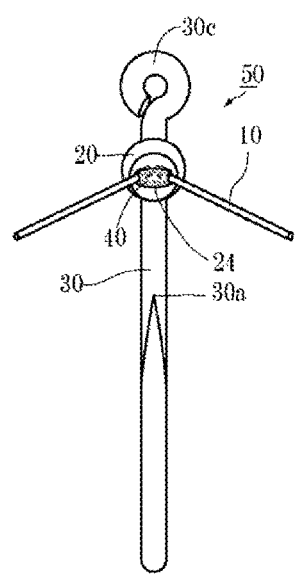

[FIG. 3]
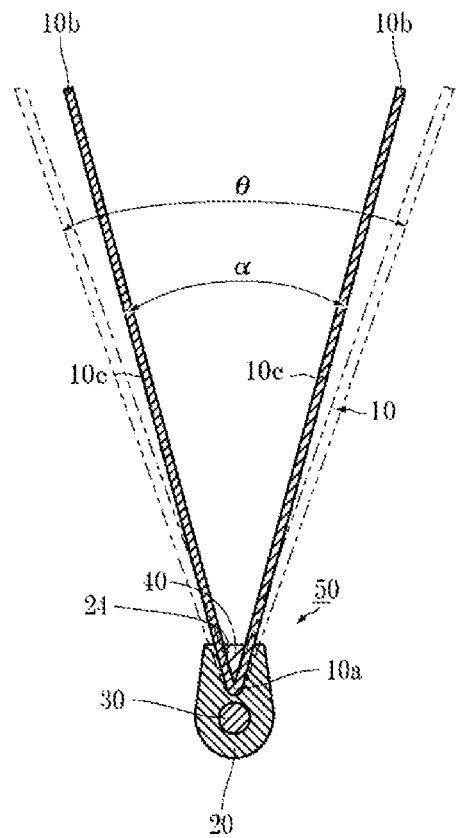
[FIG. 4]
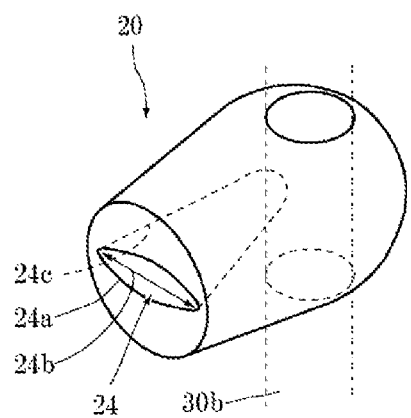

[FIG. 5]
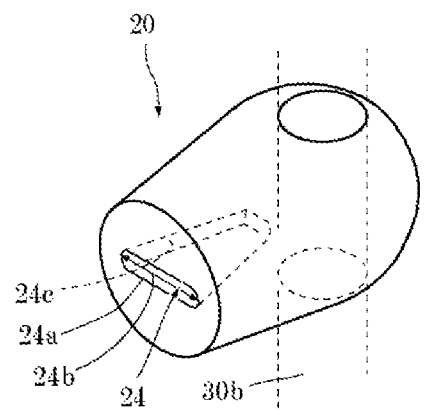
[FIG. 6]
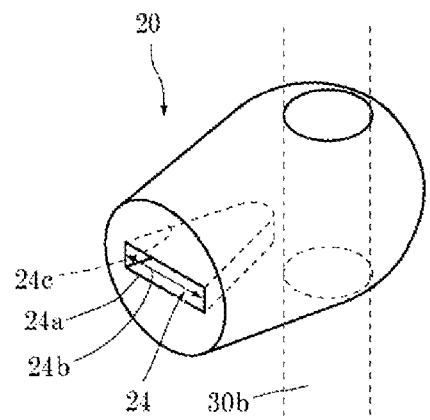

FISHING HOOK WITH GUARD

CROSS REFERENCE TO RELATED APPLICATION

This Application is a 371 of PCT/JP2015/003112 filed on Jun. 22, 2015, which is incorporated herein by reference.

TECHNICAL FIELD

The present invention relates to a fishing hook having, attached thereto, a guard that prevents the fishing hook from being caught in something, and prevents waterweed or floating matter from being undesirably caught by the fishing hook.

BACKGROUND ART

In lure fishing, in order to improve a fishing result, it is essential to: cast far a fishing hook to which a lure is attached; reel a fishing line while handling a fishing rod to move the lure as if it is real one, thereby to attract fish hiding near an obstacle in water such as a rock, a fallen tree, or waterweed, or near floating matter at the surface of water; and cause the fish to bite the lure together with the fishing hook. However, when the fishing line is reeled while handling the fishing rod as described above, the fishing hook is often caught in an obstacle or floating matter, which results in the lure and/or the fishing hook being lost, or agitates surrounding water to scare the fish away. Therefore, in recent years, there is an increase in demand for a guard-equipped fishing hook that is not likely to be caught in such obstacle and floating matter, and enables landing of fish that bites the fishing hook without releasing the fish.

As examples of such a fishing hook, Patent Literature 1 (Japanese Laid-Open Patent Publication No. 2003-70381) and Patent Literature 2 (Japanese Patent No. 4778451) disclose fishing hooks (jig heads) each being equipped with a brush guard.

Patent Literature 1 discloses a fishing hook using a piano wire as a guard, and utilizing a torsion spring coil to make linear portions of the guard, which are spread in a V shape, flexible. The guard is provided such that the linear portions thereof are spread in a V shape in front of a tip of the hook, and are inclined with respect to the tip of the hook. This guard is fixed such that an attachment base thereof provided with the torsion spring coil is fixed to a main body (shank) of the fishing hook by using a binding thread.

In the jig head disclosed in Patent Literature 2, a brush guard composed of a large number of monofilaments made of resin is provided at a sinker portion having a hook at its front end.

When the fishing line is reeled while handling the fishing rod as described above, each of the aforementioned fishing hooks might come into contact with waterweed in water and floating matter at the surface of water. However, the guard that is provided in front of and inclined with respect to the tip of the fishing hook clears the waterweed and the floating matter to prevent them from coming into contact with the tip of the fishing hook. When fish bites the fishing hook together with the lure, the guard needs to fall down or deform with little resistance by being pushed by the palate of the fish that bites the fishing hook. Therefore, in Patent Literature 1, the torsion spring coil is adopted in order to make the inflexible linear portions of the guard appropriately flexible.

In Patent Literature 2, since the guard is made of resin that is less firm (more flexible) than a piano wire, the brush guard is formed by binding the large number of monofilaments to add firmness.

CITATION LIST

Patent Literature

[PTL 1] Japanese Laid-Open Patent Publication No. 2003-70381
[PTL 2] Japanese Patent No. 4778451

SUMMARY OF INVENTION

Technical Problem

However, in manufacturing the fishing hook disclosed in Patent Literature 1, it requires a great deal of skill to fix the attachment base to which the guard having the linear portions spread in a V shape and the torsion spring coil are attached, to the shank of the fishing hook having a sharp tip, at a predetermined position in the aforementioned posture, by accurately winding the binding thread, and this work needs certain man-hours.

In the case of Patent Literature 2, an attachment hole is provided at the sinker portion of the jig head, and the brush guard composed of the large number of monofilaments made of resin is fixed to the attachment hole by using an adhesive agent. In this structure, in contrast to Patent Literature 1, the guard need not be fixed by using a binding thread, thereby achieving a reduction in man-hours for the binding work. However, in order to gather the large number of monofilaments and quickly insert the bundle of monofilaments into the attachment hole, with the adhesive agent being applied at an insertion end of the bundle, a certain clearance is needed between the bundle and the attachment hole. Therefore, at the final attachment position, the large number of monofilaments need to be held with the angle thereof with respect to the tip portion of the fishing hook being maintained until the adhesive agent is completely solidified, which may result in an increase in time required for the brush guard attachment work. Even if a jig is used for this work, mounting and demounting of this jig take time.

In addition, the guard of Patent Literature 1 is voluminous because the linear portions thereof are spread in a V shape, and is likely to be plastically deformed when a large external force is applied thereto because the guard is formed of a piano wire. Even when the fishing hook is stored in a container, if the guard is plastically deformed during transport or sales at a store, the guard does not return to its original shape, and thus the commodity value of the fishing hook is lost.

Likewise, since the brush guard of Patent Literature 2 is made of nylon, the brush guard is not firm and likely to be deformed as described above, and therefore, the shape thereof is likely to be distorted during sales.

In either case, if the guard is deformed as described above during use, the guard does not return to its original shape, leading to a problem that guard is poor in durability.

An object of the present invention is to provide a guard-equipped fishing hook that enables attachment of a guard to a fishing hook in an extremely simple manner and in a short time, and can always maintain its original shape at manufacture, during use and even during transport and sales.

Solution to Problem

To achieve the above objects, as shown in FIG. 3, a guard-equipped fishing hook 50 according to the present invention includes: a fishing hook 30; a guard 10 formed by bending a wire-like material in a V shape; and a base 20 fixed to a shank 30b of the fishing hook 30 and having a guard attachment hole 24 formed therein, the guard attachment hole 24 holding the guard 10 such that the guard is positioned in front of a hook tip 30a when an insertion end 10a as a bent end of the guard 10 is inserted in the guard attachment hole 24. The guard 10 is made of a superelastic alloy, is provided in the guard attachment hole 24 so as not to cross the shank 30a of the fishing hook 30, and is fixed to the guard attachment hole 24 with an adhesive agent 40. The guard attachment hole 24 is formed such that an opening 24a thereof has an elliptical shape, or an elongated-circle shape, or a rectangular shape, a cross section cut along a major axis 24b of the opening 24a has a substantially isosceles triangular shape or a substantially equilateral trapezoid shape, and a depth of the guard attachment hole 24 does not reach the shank 30a of the fishing hook 30. A bending angle θ of the insertion end 10a of the guard 10 before being attached to the guard attachment hole 24 is larger than an opening angle α of the guard attachment hole 24.

In the structure described above, when the insertion end 10a as the bent portion of the guard 10 made of the superelastic alloy is inserted into the guard attachment hole 24, the V shape of the guard 10 is deformed from the bending angle θ to the opening angle α toward the deepest end of the guard attachment hole 24, and receives a resistive force, against the insertion, from the side walls of the guard attachment hole 24 with which the guard 10 contacts. This force is a frictional force caused by the materials, the shapes, the surface states, and the like of the guard 10 and the side walls of the guard attachment hole 24, and is a resilient force of the guard 10, made of the superelastic alloy, that attempts to return to the original shape. The guard 10 is inserted to the deepest end of the guard attachment hole 24 with a force that exceeds a composite force of the frictional force and the resilient force. Thus, the guard 10, in the above state, is automatically and accurately fixed along a portion, of the guard attachment hole 24, having the largest distance between inner side surfaces 24c. Further, in particular, "the opening 24a of the guard attachment hole 24 has an elliptical shape, or an elongated-circle shape, or a rectangular shape, and the cross section cut along the major axis 24b of the opening 24a has a substantially isosceles triangular shape or a substantially equilateral trapezoid shape", and therefore, the insertion end 10a of the inserted guard 10 automatically fits on the inner side surfaces 24c on the major axis 24b side.

The superelastic alloy also has a shape memory function. Therefore, even when the guard 10 is deformed during use by being caught in an obstacle or bitten by fish, or deformed to some extent due to an external force applied thereto during transport or sales at a store, the guard 10 can return to the original shape as long as the amount of deformation is not excessive, that is, not greater than 8 to 10%, and thus the appearance is not degraded. In other words, the guard-equipped fishing hook 50 of the present invention is excellent in durability during use, and moreover, has less degradation in commodity value in a course of distribution.

There are cases where the guard 10 is inserted into the guard attachment hole 24 with an adhesive agent 40 being applied to the insertion end 10a in advance, and where the adhesive agent 40 is injected after insertion of the guard 10. In either case, since the guard 10 is uniquely fixed to the guard attachment hole 24 due to the aforementioned function, attachment of the guard 10 is very simple.

Claim 2 relates to the relationship between the shank 30b and the opening 24a of the guard attachment hole 24, which is characterized in that "the major axis 24b of the opening 24a of the guard attachment hole 24 is provided so as to be orthogonal to the shank 30b of the fishing hook 30 in a plan view with respect to the opening 24a of the guard attachment hole 24. Thus, only by inserting the guard 10 into the guard attachment hole 24, linear portions 10c of the guard 10 can be accurately arranged in a symmetrical manner, around and in front of the hook tip 30a.

Advantageous Effects of Invention

According to the present invention, the guard, made of the superelastic alloy, has extremely excellent flexibility (elasticity) and resilience that cannot be attained by conventional elastic metals (e.g., piano wire), and even if being slightly deformed, the guard returns to the original shape. Therefore, the guard is superior in performance of maintaining the original positional relationship with the hook tip of the fishing hook, to the torsion spring coil disclosed in Patent Literature 1 and the brush guard composed of a large number of monofilaments disclosed in Patent Literature 2. Further, even when the guard-equipped fishing hook is continuously used, the guard can avoid obstacles and floating matter without causing mispositioning thereof, and further, can contribute to prevention of reduction in the hooking rate.

In the work of attaching the guard, the V-shaped guard can be attached at a predetermined position and/or angle only by being inserted into the guard attachment hole, thereby significantly reducing work man-hours.

BRIEF DESCRIPTION OF DRAWINGS

FIG. 1 is a front view of a brush guard-equipped fishing hook to which the present invention is applied.

FIG. 2 is a plan view of the brush guard-equipped fishing hook to which the present invention is applied.

FIG. 3 is a cross-sectional view taken along a line A-A in FIG. 1.

FIG. 4 is an enlarged perspective view of a base (first example) of the present invention.

FIG. 5 is an enlarged perspective view of a base (second example) of the present invention.

FIG. 6 is an enlarged perspective view of a base (third example) of the present invention.

DESCRIPTION OF EMBODIMENTS

Hereinafter, an embodiment of the present invention will be described with reference to the drawings. FIG. 1 is a front view showing a guard-equipped fishing hook 50 of the present invention. This guard-equipped fishing hook 50 is composed of a guard 10, a base 20, and a fishing hook 30.

The guard 10 is formed by using a wire-like material (wire) made of a superelastic alloy. While an Ni—Ti superelastic alloy is used in this embodiment, another superelastic alloy (Fe—Mn—Si alloy) having flexibility and resilience may be used.

The superelastic alloy is also called a shape memory alloy. The shape memory alloy has a property of, when being deformed, returning to its original shape at a temperature not lower than its transformation point. The range of deformation is far broader than that of an ordinary spring material such as a piano wire. In the present embodiment, although not particularly limited, the transformation point of the superelastic alloy is not higher than a normal temperature.

The superelastic alloy (shape memory alloy) exhibits the property of returning to the original shape when a predetermined temperature (in this embodiment, a temperature lower than or equal to the normal temperature) is applied against bending (distortion) within 8 to 10% of a metal crystal structure thereof. However, if the superelastic alloy is extremely deformed to such an extent that the metal crystal structure thereof is altered, the superelastic alloy does not return to the original shape anymore, and is plastically deformed. The plastically-deformed shape of the superelastic alloy is "memorized".

In the present embodiment, the guard 10 is formed by bending a single wire-like material into a V shape at its center portion. This bent portion of the guard 10 is an insertion end 10a, and end portions of the guard 10 other than the insertion end 10a are leading ends 10b. Regarding the diameters of the wires used for the guard 10, if the wire-like material is Ni—Ti superelastic alloy, wires having diameters that are between 0.1 mm and 0.4 mm and at intervals of 0.1 mm are preferably prepared.

The base 20 is made of a metallic material (e.g., Sn). A split mold (not shown) is mounted at a predetermined position in a shank 30b of the fishing hook 30 so as to be adjacent to an eye 30c of the fishing hook 30, and a molten metal is cast in the mold. In the mold, a cavity for the base 20 is formed. Subsequent to the casting of the molten metal, a hole formation member for forming a guard attachment hole 24 is inserted from a casting port of the mold, whereby the guard attachment hole 24 is formed in the cast metal. The inserted portion of the hole formation member has the same shape as the guard attachment hole 24. Regarding the insertion direction, the hole formation member is inserted such that, as shown in FIGS. 1 and 2, the guard 10 is slightly inclined with respect to the hook tip 30a in front of the hook tip 30a. When the molten metal is solidified, the hole formation member is pulled out and the mold is removed, thereby obtaining the fishing hook 30 having the base 20 integrally fixed at the aforementioned position.

The base 20 may be made of a resin material. In this case, the base 20 is formed by insert injection molding, for example. In either case, the guard attachment hole 24 has an appropriate depth and an appropriate opening angle that enable the guard 10 to be firmly fixed.

Further, an upper portion of the base 20 (a portion opposite to the guard attachment hole 24) is formed in a substantially hemispherical shape. An outer surface of a portion of the base 20 where the guard attachment hole 24 is formed is tapered toward an opening 24a of the guard attachment hole 24.

The fishing hook 30 is obtained by bending a leading-end side of the shank 30b in a J-shape. The fishing hook 30 has a barb 30d and the pointed hook tip 30a at an end thereof, and has the eye 30c at the other end thereof. In the present embodiment, the eye 30c is formed in a ring shape. As described above, the base 20 is provided at a portion, of the shank 30b, adjacent to the eye 30c.

Then, the guard 10 is attached to the base 20 of the fishing hook 30. In this case, as shown in FIGS. 1 and 2, the insertion end 10a of the guard 10 is inserted in the opening 24a of the guard attachment hole 24 of the base 20. The spread angle (bending angle) θ of the guard 10 is larger than the opening angle α of the guard attachment hole 24. Therefore, the guard 10 is deformed to make the spread angle (bending angle) θ smaller than the opening angle α, and in this state, the guard 10 is inserted to the deepest end of the guard attachment hole 24.

The opening 24a of the guard attachment hole 24 is formed in, for example, an elliptical shape, an elongated-circle shape, or a rectangular shape as described above. The guard attachment hole 24 is formed so as to be linearly tapered from the opening 24a to the deepest end thereof. A cross section including a major axis 24b of the opening 24a is a substantially isosceles triangle or a substantially equilateral trapezoid. Therefore, the guard 10, which has left the hand, is accurately fixed by its resilient force, along a portion, of the guard attachment hole 24, having the largest distance between inner side surfaces of the guard attachment hole 24 (intersection line between a plane including the major axis 24b and the inner side surfaces of the guard attachment hole 24).

There are cases where the guard 10 is inserted into the guard attachment hole 24 with an adhesive agent 40 being applied to the insertion end 10a in advance, and where the guard 10 is inserted without the adhesive agent 40 and is temporarily fitted in the guard attachment hole 24 by its resilient force, and thereafter, is fixed when the guard attachment hole 24 is filled with the adhesive agent 40.

Since the adhesive agent 40 is in a sol state before being solidified, the guard 10 is not prevented from being located, by its resilient force, at the appropriate position in the guard attachment hole 24. Moreover, since the guard 10 is a superelastic alloy wire, the guard 10 has a force of returning to some extent in the spread direction even when being strongly bent in a V shape. Therefore, even with the resistance of the sol-state adhesive agent 40, the guard 10 is always located at the appropriate position only by being simply inserted into the guard attachment hole 24. It is preferable to use an instantaneous adhesive agent as the adhesive agent 40.

When an ordinary adhesive agent is used as the adhesive agent 40, the guard-equipped fishing hook 50 may be heated to the normal temperature or more to solidify the adhesive agent 40 early. During this period, the guard 10, if being deformed, returns to its original shape early due to the heating.

The guard-equipped fishing hook 50 manufactured as described above is packaged and transported to be shipped to the market. During the transport or when being displayed and sold at a store, the guard 10 may be deformed due to a large force applied thereto. Even in such a case, since the guard 10 is made of the superelastic material having the transformation point not higher than the normal temperature, the guard 10 returns to the original linear state with a lapse of time, and therefore, the commodity value is not degraded. This also applies to when the guard-equipped fishing hook 50 is used. That is, even if the guard 10 is deformed when being bitten by fish or caught in an obstacle, the guard 10 returns to the original shape while being allowed to stand.

In the above-described embodiment, the single guard 10 bent in a V shape is used. However, a plurality of guards 10 may be used for one guard-equipped fishing hook 50 by increasing the size of the guard attachment hole 24 or by providing a plurality of guard attachment holes 24 in parallel to each other.

According to the present invention, in the work of attaching the guard 10, the guard 10 can be attached at a predetermined position and/or angle only by inserting the insertion end 10a thereof into the guard attachment hole 24, thereby significantly reducing work man-hours. In addition, since the guard 10, even when being deformed, returns to the original shape while being allowed to stand, the guard-equipped fishing hook 50 is advantageously excellent in merchantability, and excellent in durability when used.

REFERENCE SIGNS LIST 10 guard
10a insertion end
10b leading end
10c linear portion
20 base
24 guard attachment hole
24a opening
24b major axis
24c inner side surface
30 fishing hook
30a tip
30b shank
30c eye
30d barb
40 adhesive agent
50 brush guard-equipped fishing hook
θ bending angle
α opening angle

The invention claimed is:

1. A guard-equipped fishing hook comprising:
a fishing hook;
a guard formed by bending a wire-like material in a V shape; and
a base fixed to a shank of the fishing hook and having a guard attachment hole formed therein, the guard attachment hole holding the guard such that the guard is positioned in front of a tip of the fishing hook when an insertion end as a bent end of the guard is inserted into the guard attachment hole, wherein
the guard is made of a superelastic alloy, is provided in the guard attachment hole so as not to cross the shank of the fishing hook, and is fixed to the guard attachment hole with an adhesive agent,
the guard attachment hole is formed such that an opening thereof has an elliptical shape, or an elongated-circle shape, or a rectangular shape, a cross section cut along a major axis of the opening has a substantially isosceles triangular shape or a substantially equilateral trapezoid shape, and a depth of the guard attachment hole does not reach the shank of the fishing hook, and
a bending angle of the insertion end of the guard before being attached to the guard attachment hole is larger than an opening angle of the guard attachment hole.

2. The guard-equipped fishing hook according to claim 1, wherein a major axis of the opening of the guard attachment hole is provided so as to be orthogonal to the shank of the fishing hook in a plan view with respect to the opening of the guard attachment hole.

* * * * *